Feb. 22, 1955   O. STEINER   2,702,673
PHOTOGRAPHIC FILM CARTRIDGE
Filed May 19, 1951   2 Sheets-Sheet 1
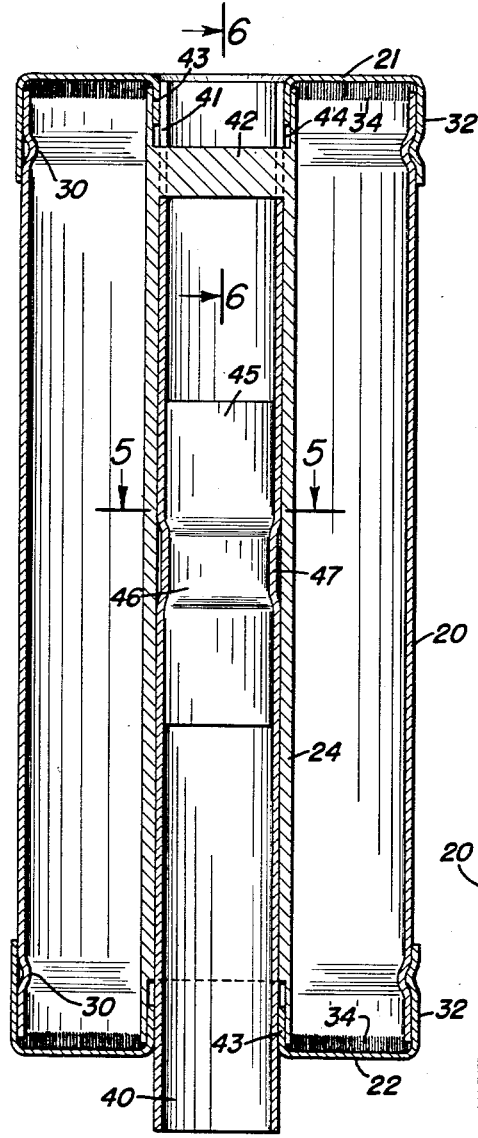
Fig. 1.
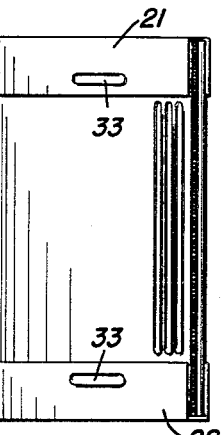
Fig. 2.
Fig. 3.
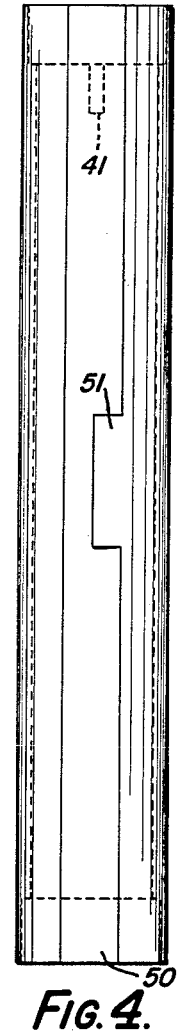
Fig. 4.
Fig. 5.
INVENTOR.
OSCAR STEINER
BY 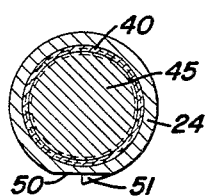
ATTORNEY Feb. 22, 1955 — O. STEINER — 2,702,673
PHOTOGRAPHIC FILM CARTRIDGE
Filed May 19, 1951 — 2 Sheets-Sheet 2

INVENTOR.
OSCAR STEINER
BY
ATTORNEY

United States Patent Office 2,702,673
Patented Feb. 22, 1955

2,702,673

PHOTOGRAPHIC FILM CARTRIDGE

Oscar Steiner, Rochester, N. Y., assignor to Graflex, Inc., Rochester, N. Y., a corporation of Delaware Application May 19, 1951, Serial No. 227,131

3 Claims. (Cl. 242—71)

The present invention relates to a film-holding cartridge or cassette for photographic cameras and to film for use therewith. More specifically the invention relates to roll film and to film cartridges or cassettes for use in automatic cameras, and more particularly to roll film and to cartridges or cassettes for use in automatic cameras such as are employed for making photographic records of the readings of meters in telephone exchanges.

Conventional roll film for amateur use is usually made with a lead end of narrow width which can be inserted in a slot in a spool. Certain types of film, in addition to having a leader, are made with uniformly spaced perforations along the two longitudinal marginal edges of the film, and the winding spool is then provided with gear teeth at opposite ends to engage in these perforations and take up the film. In automatic roll film cameras, in addition to the leader, means has heretofore been provided on the film for indicating when the starting end of the sensitized portion of the fim has reached the exposure aperture of the camera so as to inform the photographer when the leader has been wound up on the take-up spool and the film is in position for taking the first picture. Various means have been provided heretofore for indicating when the film has reached picture-taking position. For instance, in one arrangement an electrically conductive strip is provided on the film which establishes an electric indicating circuit when the film reaches picture-taking position, and in another arrangement a slot is provided in the film which permits an electrical contact member to project through the film and establish an electric indicating circuit.

Film cartridges or cassettes have come more and more into use for roll film because they provide a convenient light-tight package in which both to ship and to handle the film. Furthermore, by using a film cartridge or cassette it is possible to employ sensitized paper as the sensitized photographic medium without danger of "end-fogging" the paper. When sensitized paper is used without a cassette, the supply and take-up spools employed have to have their end flanges spaced far enough apart axially to allow for swelling of the paper when the atmospheric humidity is high; under low humidity conditions, then, the paper tends to shrink away from the end flanges of the spools allowing light leakage between the end flanges and the paper to "end fog" the paper. A cassette being light-tight prevents "end-fogging" of sensitized paper regardless of humidity conditions. Moreover, the use of a film cartridge or cassette, permits of quickly inserting a new roll of film into a camera and of quickly removing an exposed roll of film therefrom.

Where the film cassette houses the take-up core or spool, the lead end of the film from the supply spool has to be fed blindly to the take-up core or spool through an opening in the cassette, in order to attach the lead end of the film to the take-up core or spool. With known forms of cassettes this is impracticel. As a result cassettes have been used heretofore only to hold the film supply core, not the take-up core or spool, and after the film has been exposed, it has been necessary heretofore, therefore, when a cassette has been used, to rewind the exposed film off of the take-up spool into the supply cassette, before removing the exposed film from the camera. When the film strip is of great length the rewinding operation takes considerable time and is tedious. Rewinding also increases the possibility of abrasion of the sensitized film surface.

One object of the present invention is to provide photographic film whose lead end is so constructed as to readily adapt itself to be picked up and wound upon a take-up core or spool.

Another object of the present invention is to provide photographic film whose lead end is so constructed as to be readily gripped and drivingly engaged by a take-up core or spool, thereby eliminating any need for a long leader, and as a result also eliminating any need of providing in an automatic camera any indicating means for indicating when the leader has been wound up and the starting end of the sensitized portion of the film has reached picture-taking position for the first exposure.

Another object of the invention is to provide a film cartridge or cassette which may be used not only for housing the film supply spool but also for housing the film take-up spool.

Another object of the invention is to provide means for easily and quickly connecting the lead end of a roll of film to the core of a film cartridge or cassette to facilitate winding the film upon the core.

Another object of the invention is to provide a film cartridge or cassette adapted to receive the lead end of a roll film strip and, upon turning of the winding key or drive shaft of the camera, to grip the lead end of the film and wind the film upon a take-up spool or core.

A further object of the invention is to provide a film cartridge or cassette and film for use therewith which are so constructed that, upon insertion of the lead end of the film into the cartridge or cassette, the lead end of the film will automatically be guided into position where it may be drivingly engaged by a core or spool mounted within the cartridge or cassette and may be wound upon the core or spool upon rotation of the core or spool.

Another object of the invention is to provide a core member for a cassette which will automatically attract the lead end of the film which is inserted in the cassette and draw it down into position where it can readily be engaged by a driving member on the core.

Another object of the invention is to provide a film cartridge or cassette having a driving spool or core so constructed that it will readily wind-up film after it has been drivingly engaged with the lead end of the film so that the film need not have any leader, nor need it be perforated; this makes for low cost.

Other objects of the invention will be apparent hereinafter from the specification and from the recital of the appended claims.

In the drawings:

Fig. 1 is an axial section taken on the line 1—1 of Fig. 2, and showing a film holding cartridge or cassette made according to one embodiment of this invention mounted on the drive spindle of an automatic camera;

Fig. 2 is an end view of this cassette on a somewhat reduced scale;

Fig. 3 is a side elevation of this cassette also on a reduced scale;

Fig. 4 is a side elevation of the core member of the cassette on the scale of Fig. 1;

Fig. 5 is a section on the line 5—5 of Fig. 1;

Figure 6:
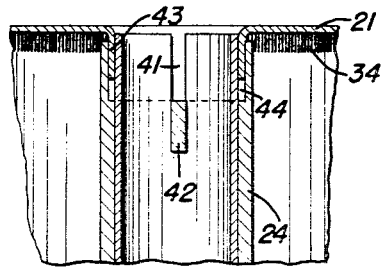
Fig. 6 is a fragmentary view taken at right angles to Fig. 1 and showing a further detail of the mounting of the core member on the drive shaft of the camera.

Referring now to the drawings by numerals of reference, 20 denotes the body portion of the cartridge or cassette; 21 and 22 are the end caps for the cartridge or cassette; and 24 is the core which is rotatably mounted in the cartridge or cassette. The caps 21 and 22 may be made identical with one another so as to be interchangeable.

The body portion 20 of the cartridge is made of a thin sheet and is flexible. It has an axially extending mouth or opening for insertion of the film into the cartridge or for withdrawal of the film therefrom. This mouth or opening is defined and bounded by an inturned portion 25 (Fig. 9) and a reversely bent portion 26. Strips 27 and 28 of plush or similar suitable material are crimped in the lips 25 and 26 of the body portion to make it light-tight.

Near its opposite ends, the body portion 20 is crimped, as denoted at 30 (Fig. 1) to provide parallel arcuate grooves which may extend around the major portion of the periphery of the body adjacent the opposite ends thereof. The skirt portion 32 of each end cap 21 and 22 is formed by crimping with three equiangularly spaced teats 33 (Fig. 3) which are adapted to be engaged in the grooves 30 to hold the caps on the body portion.

Both caps 21 and 22 may be lined with plush 34 (Fig. 6) for light-tightness. Each cap is generally pear-shaped in cross section, and has its skirt and end cut away as denoted at 36 (Fig. 2) to provide room for the axially-projecting end portions of the lips 25 and 26 of the body. Caps 21 and 22, as well as the body portion 20, are made preferably of metal of thin section so that they are resilient. When the caps 21 and 22 are pushed over the ends of the body portion, then, the skirts 32 of the caps compress the body portion within the caps and confine the body portion; and the teats 33 on the caps snap into the grooves 30 of the body portion to securely hold the caps on the body portion.

Each cap 21 and 22 has a central opening which is bounded by a circular flange 43 (Figs. 1 and 6). These flanges serve as bearings or supports for the tubular core 24 of the cassette.

When the film cartridge or cassette of the present invention is used in an automatic camera it is mounted upon the drive spindle 40 (Fig. 1) of the camera. For this purpose, the drive spindle, which is tubular, may be diametrically slotted as denoted at 41 in Fig. 6; and the core 24 may be provided adjacent one end with a diametral tongue or web 42 (Figs. 1 and 6) which is engageable in the slot 41.

The thickness of the wall of the tubular core 24 of the cassette is reduced at its opposite ends, where it bears on the flanges 43 of the caps 21 and 22 as shown in Fig. 1, and when the cassette is mounted on the tubular drive shaft 40 of the camera the flanges 43 of the caps engage and seat on the periphery of the drive shaft in the recesses 44 (Fig. 1) between the outside of the drive shaft 40 and the inside of the core. In this way the two flanges 43 serve as bearings and as light traps for the core 24 and for the drive shaft 40.

Mounted within the tubular drive shaft 40 approximately midway the length thereof is a cylinder 45 of permanent magnetic material. This magnetic cylinder is held against axial displacement relative to the drive shaft by providing it with a slightly reduced diameter midway of its length, as denoted at 46, and by crimping the drive shaft tube, as denoted at 47, to engage in the peripheral recess 46 in the magnetic cylinder 45.

The peripheral surface of the core 24 is slabbed off for its full length, as denoted at 50 (Figs. 4 and 5) and has a driving lug or dog 51 formed thereon midway its length to project radially beyond the slabbed off surface 50.

Figure 7:
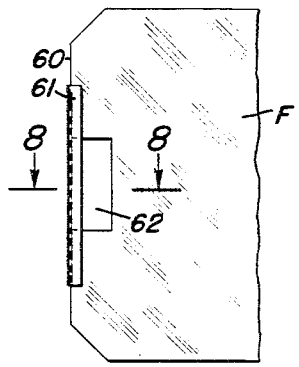
Fig. 7 is a fragmentary view showing the lead end of a strip of film constructed according to the present invention for use with the cassette of the present invention.
Figure 8:
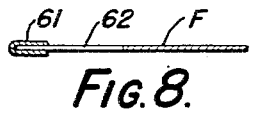
Fig. 8 is a section on the line 8—8 of Fig. 7.

The roll of film F (Figs. 7 and 8), which is adapted to be used with the cartridge or cassette, need have no marginal perforations. Secured to its lead edge 60, however, is a thin metallic strip 61, and provided in the lead end of the film directly behind the metallic strip 61 is a rectangular opening or cut-away portion 62. The metallic strip 61 is made of magnetically attractable material and is bent around the lead end of the film. It is adapted to be attracted and held by the permanent magnet 45 in the drive shaft of the camera, while the opening or slot 62 is adapted to receive the driving lug 51 of the core 24.

It is easy to quickly assemble the cartridge. The core 24 can be seated at one end on the bearing portion 43 of one of the caps; the body portion 20 of the cartridge can then be shoved into this cap; and the other cap can be shoved onto the body portion 20 of the cartridge and over the other end of the core 24.

Figure 9:
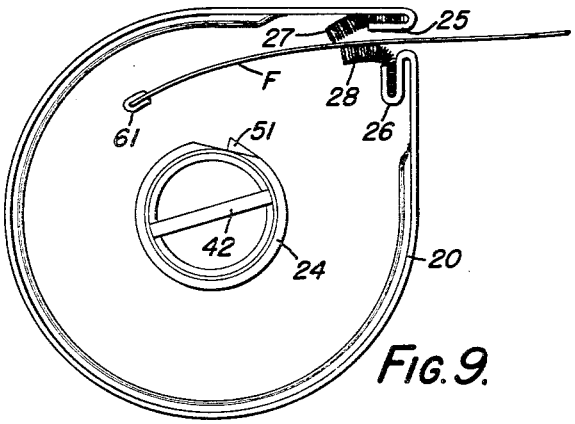
Fig. 9 is an end view of the cartridge or cassette with one of its caps removed, and showing the lead end of a roll of film being threaded into the cartridge.
Figure 10:
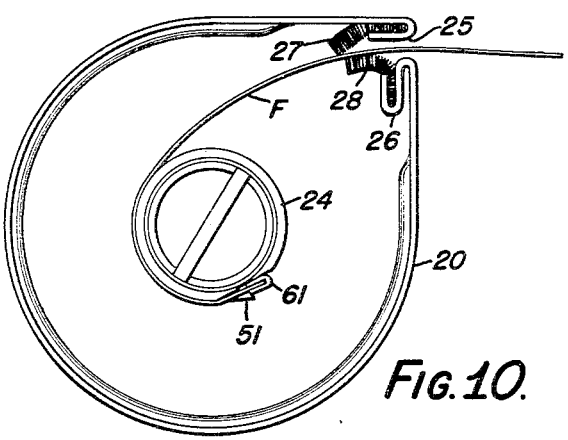
Fig. 10 is a corresponding view showing the lead end of the film engaged by the core and the film in process of being wound on the core.
Figure 11:
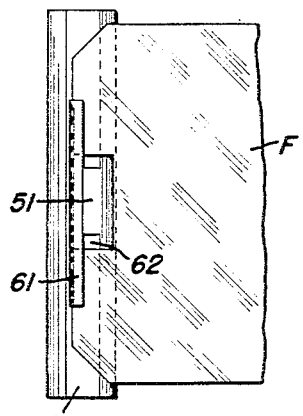
Fig. 11 is a side elevation showing the driving lug of the core engaged drivingly with the lead end of the film.

In use, the cartridge is positioned in a camera by shoving it over the drive shaft 40 of the camera until the web or tongue 42 bottoms in the diametral slots 41 of the drive shaft. Then the lead end of the film F from the supply spool or core of the camera is inserted through the mouth of the body portion 20 of the cartridge as shown in Fig. 9. The magnet 45 attracts the metal strip 61 on the lead end of the film and pulls the metal strip down onto the periphery of the core 24. When the core is rotated counterclockwise, as viewed in Fig. 9, by rotation of drive shaft 40, the dog 51 enters the slot 62 (Fig. 7) in the lead end of the film and engages against the rear of the metal strip 61. In the further rotation of the drive shaft 40, then, the core drives the film (Fig. 10).

After all of the film has been exposed, the take-up cartridge with the exposed film wound thereon is removed from the camera, and the cartridge, which has previously been used as the supply cartridge, is shifted to the take-up position in the camera, and a new cartridge loaded with film is introduced into the camera as the supply cartridge, and the lead end of its film strip inserted in the mouth of the shifted cartridge. The cartridge with the exposed film therein is light-tight and provides a ready case for shipping the film to a point where the film can be developed.

The cartridge or cassette of the present invention has definite advantages for military purposes and for commercial usage because it permits daylight loading and unloading of the camera in the field due to the ligh-tight protection of the film. It also eliminates any need of providing the film with a long leader. This reduces winding time before exposure to a minimum. Moreover, need for any means to indicate when the film is in position for taking the first picture is eliminated. This simplifies the construction of automatic cameras, and reduces their cost. Furthermore, because of the positive driving engagement of lug 51 with the film, the film used wth the cassette need not be perforated. This makes it possible to use relatively inexpensive film even in the largest widths. Still further, because the cassette of the present invention makes it possible to use a cassette as a take-up cassette, it obviates rewinding of film from a take-up spool back into a supply cassette after exposure. This makes it practical to use greater lengths of roll film in a camera. Film strips thirty-five feet in length have already proved practical with my cassette. With conventional cassettes such lengths of film would be wholly impractical because of rewinding time after exposure. The present invention therefore permits of taking a great number of pictures with a single loading and unloading of the camera.

While the invention has been described in connection with an embodiment in which the permanent magnet forms part of a camera drive shaft, the magnet might instead be secured to the core of the cassette, and the core might be driven, for instance, by a conventional camera key instead of the drive shaft. Furthermore, while the magnet has been shown in one piece it might be made of a plurality of pieces mutually attracting one another. It will be understood, therefore, that while the invention has been described in connection with a particular embodiment thereof, it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In combination, a film cartridge adapted to be used to house a roll of film having a magnetically attractable strap on its lead end and an aperture therein immediately behind said strap, said film cartridge being wholly closed except for an axially-extending slot in one side thereof through which the lead end of a strip of film may be inserted, flexible means for closing said slot and rendering the film cartridge light-tight, a core rotatably mounted in said cartridge, said core being generally cylindrical in shape but being slabbed off axially to provide a flat axially extending surface, and said core being formed with a drive lug projecting radially beyond part of said slabbed surface, and a permanent magnet connected to said core, said magnet being adapted to attract the magnetic strap on the lead end of the film and said drive lug being adapted to engage in the aperture in the film immediately behind said strap.

2. In combination, a film cartridge for photographic roll film that has a magnetically attractable metal scrap attached to its lead end, said cartridge comprising a shell closed at both ends but having a longitudinal slot at one side thereof through which the lead end of a photographic film strip may be inserted blindly into said cartridge, said cartridge being closed at both ends and around its periphery except for said slot, resilient means for closing said slot to render said cartridge light-tight, a core member rotatable in said shell and having a driving member projecting from its periphery to engage drivingly with said film strip, and a permanent magnet connected to said core member to rotate therewith and adapted to attract the lead end of said film strip when said lead end is inserted in said said slot, the outside diameter of said core member being smaller than the inside diameter of said cartridge, whereby to permit film to be wound on said core member between said core member and said cartridge.

3. In combination, a film cartridge for photographic roll film which has a magnetic metal strap secured to its lead end that is of greater thickness than the thickness of the film, and which has an aperture in it behind said strap, said cartridge having a slot at one side thereof through which the lead end of the film may be inserted blindly into said cartridge, said cartridge being closed at both ends and around its periphery except for said slot, said cartridge having bearing portions at its opposite ends, a tubular core journaled at opposite ends in said cartridge on said bearing portions and having an outside diameter less than the inside diameter of said cartridge, a lug on said core adapted to engage in the aperture in said film behind said magnetic metal strap to cause the film to be wound on said core when the core is rotated, and a camera drive shaft, on which said core is coaxially mounted and secured, and a permanent magnet in said drive shaft for attracting the magnetic metal strap of the film.

References Cited in the file of this patent

UNITED STATES PATENTS

| | | |
|---|---|---|
| 1,229,357 | Webster | June 12, 1917 |
| 1,466,109 | Barton | Aug. 28, 1923 |
| 1,692,789 | Young | Nov. 20, 1928 |
| 1,973,457 | Wittel | Sept. 11, 1934 |
| 1,987,247 | Schnitzler | Jan. 8, 1935 |
| 2,005,405 | Wittel | June 18, 1935 |
| 2,060,956 | Tanzen | Nov. 17, 1936 |
| 2,395,590 | Simmon et al. | Feb. 26, 1946 |
| 2,604,831 | Fraenckel | July 29, 1952 |